United States Patent
Sarin et al.

(10) Patent No.: US 10,148,694 B1
(45) Date of Patent: Dec. 4, 2018

(54) PREVENTING DATA LOSS OVER NETWORK CHANNELS BY DYNAMICALLY MONITORING FILE SYSTEM OPERATIONS OF A PROCESS

(71) Applicant: Symantec Corporation, Mountain View, CA (US)

(72) Inventors: Sumit Manmohan Sarin, Pune (IN); Sumesh Jaiswal, Pune (IN); Bishnu Chaturvedi, Pune (IN); Arnaud Scomparin, Dublin, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 9 days.

(21) Appl. No.: 14/873,046

(22) Filed: Oct. 1, 2015

(51) Int. Cl.
G06F 21/62 (2013.01)
H04L 29/06 (2006.01)
G06F 21/60 (2013.01)
G06F 21/56 (2013.01)

(52) U.S. Cl.
CPC .......... *H04L 63/20* (2013.01); *G06F 21/566* (2013.01); *G06F 21/60* (2013.01); *G06F 21/62* (2013.01); *H04L 63/105* (2013.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 8,789,181 | B2* | 7/2014 | Blackwell | G06F 21/554 726/22 |
| 8,826,443 | B1* | 9/2014 | Raman | G06F 11/004 726/26 |
| 8,832,780 | B1 | 9/2014 | Sarin et al. | |
| 9,003,475 | B1 | 4/2015 | Jaiswal et al. | |
| 9,009,084 | B2* | 4/2015 | Brandt | H04L 63/1408 706/12 |
| 9,100,440 | B1 | 8/2015 | Manmohan | |
| 9,300,693 | B1* | 3/2016 | Manmohan | G06F 9/45558 |
| 2004/0049698 | A1* | 3/2004 | Ott | G06F 21/554 726/23 |
| 2006/0212572 | A1* | 9/2006 | Afek | H04L 63/145 709/225 |

(Continued)

OTHER PUBLICATIONS

Wuchner et al.; "Data Loss PRevention based on data-driven USage Control"; 2012; Retrieved from the Internet <URL: http://ieeexplore.ieee.org/xpls/icp.jsp?arnumber=6405363>; pp. 1-10 as printed.*

(Continued)

*Primary Examiner* — Saleh Najjar
*Assistant Examiner* — Michael W Chao
(74) *Attorney, Agent, or Firm* — Patterson + Sheridan LLP

(57) ABSTRACT

Techniques are disclosed for performing data loss prevention (DLP) by monitoring file system activity of an application having a network connection. A DLP agent tracks file system activity (e.g., file open and read operations) being initiated by the application. The DLP agent intercepts the file system activity and evaluates a file specified by the file system operation to determine whether the file includes sensitive data. If so determined, the DLP agent prevents the sensitive data from being transmitted (e.g., by blocking the file system activity, redacting the sensitive data from the file, etc.).

20 Claims, 6 Drawing Sheets

(56) References Cited

U.S. PATENT DOCUMENTS

| | | | |
|---|---|---|---|
| 2007/0113285 A1* | 5/2007 | Flowers | G06F 21/552 726/23 |
| 2008/0295174 A1* | 11/2008 | Fahmy | G06F 21/554 726/23 |
| 2009/0086252 A1 | 4/2009 | Zucker et al. | |
| 2009/0327782 A1* | 12/2009 | Ballou | H04L 12/10 713/330 |
| 2010/0115614 A1* | 5/2010 | Barile | G06F 21/552 726/22 |
| 2012/0324526 A1* | 12/2012 | Meyer | H04L 63/0227 726/1 |
| 2013/0268994 A1* | 10/2013 | Cooper | H04L 63/10 726/1 |
| 2014/0007139 A1* | 1/2014 | Janssen | G06F 9/4411 719/321 |
| 2014/0020083 A1* | 1/2014 | Fetik | G06F 21/552 726/11 |
| 2014/0194094 A1* | 7/2014 | Ahuja | H04W 4/021 455/410 |
| 2014/0317734 A1* | 10/2014 | Valencia | G06F 21/552 726/22 |
| 2014/0351810 A1* | 11/2014 | Pratt | G06F 9/45545 718/1 |
| 2015/0121538 A1* | 4/2015 | Hsu | G06F 21/53 726/26 |
| 2015/0163121 A1* | 6/2015 | Mahaffey | G06F 11/0766 707/687 |
| 2016/0055225 A1* | 2/2016 | Xu | G06F 17/30575 707/624 |
| 2016/0088002 A1* | 3/2016 | Yadav | H04L 63/1408 726/1 |
| 2016/0328562 A1* | 11/2016 | Saxena | G06F 21/56 |
| 2017/0039379 A1* | 2/2017 | Skipper | G06F 21/6209 |

OTHER PUBLICATIONS

Bagaria, Sankalp; "New HAshing Algorithm for Use in TCP Reassembly Module of IPS"; Jan. 2015; Retrieved from the Internet <URL: http://adsabs.harvard.edu/abs/2015arXiv150102062B>; pp. 1-6 as printed.*

* cited by examiner

PREVENTING DATA LOSS OVER NETWORK CHANNELS BY DYNAMICALLY MONITORING FILE SYSTEM OPERATIONS OF A PROCESS

BACKGROUND

Field

Embodiments of the present disclosure generally relate to data loss prevention (DLP), and more specifically, to monitoring file system operations of an application to prevent sensitive data from being transferred to unauthorized locations.

Description of the Related Art

Data loss prevention (DLP) generally refers to a variety of techniques to protect sensitive data. In endpoint DLP, a DLP agent can monitor and control activity occurring within a client computing system according to a policy, usually specified by an administrator (e.g., of an enterprise network). The DLP agent can block attempts to transmit sensitive data and generate incident reports describing such attempts.

Traditional DLP approaches include monitoring network activity of a particular application. For example, the DLP agent may monitor incoming and outgoing activity of a web browser executing on the client computer to identify attempts to transmit sensitive data (e.g., personal information, credit card information, confidential enterprise information, etc.) to unauthorized destinations.

Typically, applications use various protocols to establish network connections. As a result, the DLP agent must be configured to recognize the protocols to effectively monitor network activity by the application. Further, the DLP agent may be unable to support some network protocols, e.g., the protocols are encrypted, proprietary to the application, etc. Consequently, the DLP agent may be unable to detect sensitive data leaked by applications using such network protocols.

SUMMARY

One embodiment presented herein describes a method. The method generally includes intercepting a request from an application to perform a file system activity on a file upon detecting the request from the application. The method also includes determining that the application is requesting to send the file over a network. The method also includes evaluating the file according to a data loss prevention (DLP) policy. Upon determining, based on the evaluation, that the file includes sensitive data according to the DLP policy, the application is prevented from sending the sensitive data in the file over the network.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be incorporated in other embodiments without further recitation.

DETAILED DESCRIPTION

Embodiments presented herein disclose techniques to prevent sensitive data from being leaked to an unauthorized location based on file system activity of a monitored application. More specifically, embodiments provide a data loss prevention (DLP) agent configured to track file system activity of applications that have external network connections. For example, the DLP agent detects whether a given networked application requests to perform a system calls to open and read a file. Such activity may indicate that the application is attempting to send a file to an external location (e.g., a cloud repository).

When detected, the DLP agent intercepts system calls to open and read a file. The DLP agent analyzes the file, based on a DLP policy, to determine whether the file contains sensitive data. If so, the DLP agent may prevent the system call from being performed. In some cases, the DLP agent may allow the system call to be performed but redact the sensitive data prior to releasing the system call.

Advantageously, the DLP agent may prevent sensitive data from being leaked to an external source by monitoring system calls, rather than by monitoring network connections. Doing so allows the DLP agent to detect outgoing sensitive data in networked applications regardless of the network protocol used by a given network application. Therefore, the DLP agent may monitor applications that use a different network protocol from others.

Figure 1:
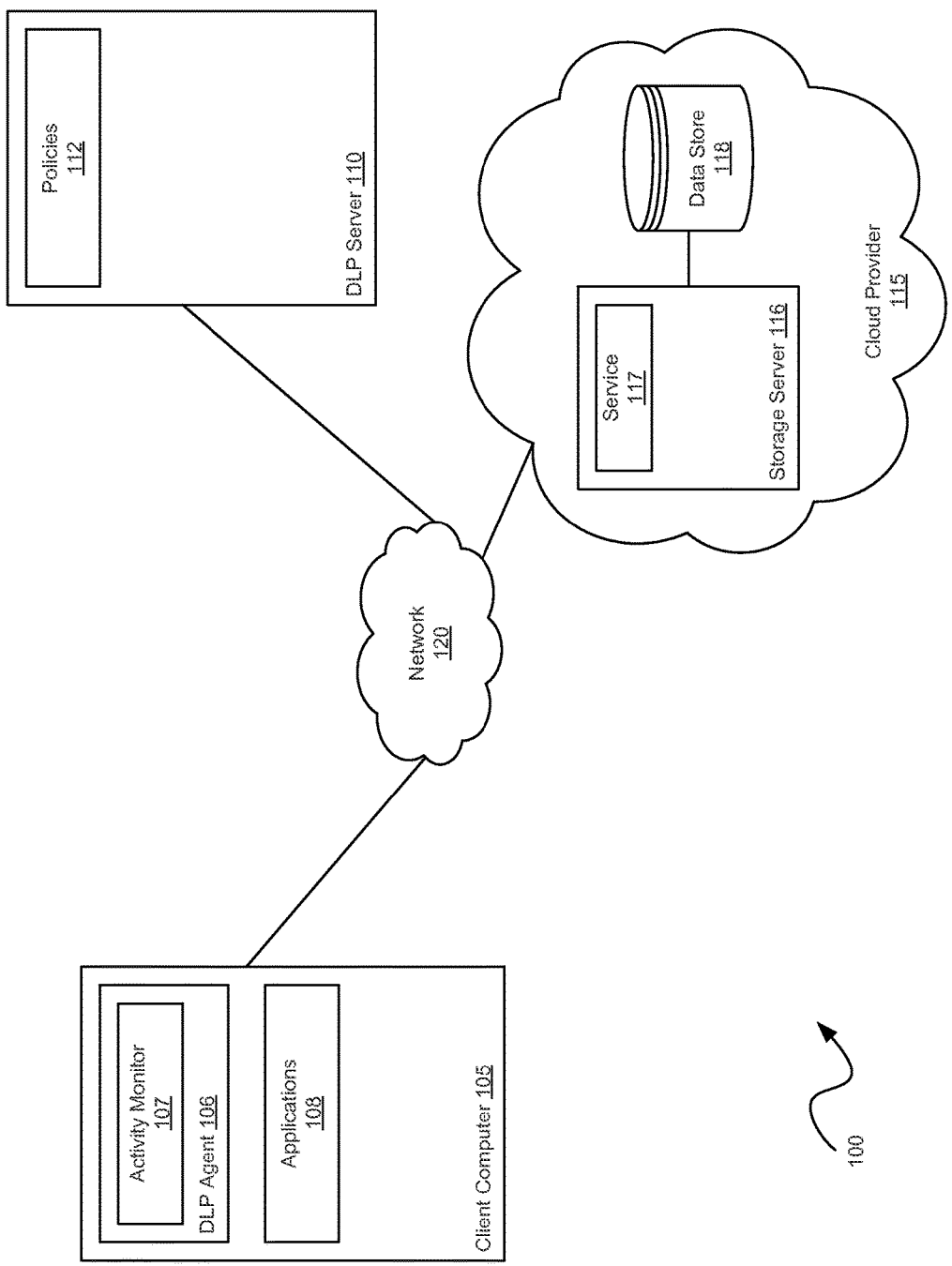
FIG. 1 illustrates an example computing environment, according to one embodiment.

FIG. 1 illustrates an example computing environment 100, according to one embodiment. As shown, computing environment 100 includes a client computer 105, data loss prevention (DLP) server 110, cloud provider 115, and a network 120. In one embodiment, the client computer 105 is a physical computing system, such as a desktop, a laptop, etc. The client computer 105 may be one of many client computers residing within an enterprise network. In one embodiment, the network 120 is the Internet.

In one embodiment, the client computer 105 includes a DLP agent 106 and one or more applications 107. The DLP agent 106 monitors and controls activity occurring within the client computer 105. The DLP agent 106 blocks attempted transmissions of sensitive data (e.g., personal information, confidential information, and the like) to locations unauthorized by the DLP policies 112 (e.g., maintained on the DLP server 110).

In one embodiment, the cloud provider 115 includes a storage server 116 and a data store 118. The storage server 116 provides a service 117 that the applications 108 may connect with to uploads files. In one embodiment, each application 108 may be configured to connect via the network 120 to do so. For example, one of the applications 108 may include a word processor application that uploads (via the service 117) word processor documents and the like for storage in the data store 118. Another example is an application 108 that sends files to an external location via the File Transfer Protocol (FTP). Each of the applications 108 may use a variety of network protocols to connect via the network 120.

In one embodiment, the DLP agent 106 includes an activity monitor 107. The activity monitor 107 tracks file system activity of the applications 108. The activity monitor 107 does so to detect whether an application 107 is attempting to connect to an external source (e.g., the service 117) and upload sensitive data (e.g., personal information, credit card information, proprietary information, etc.).

For example, the activity monitor 107 may track open and read file system operations performed by an application 108 connected to a network. Such open and read operations may indicate that the application 108 is attempting to upload a file to an external source. The activity monitor 107 may then perform some action according to a policy 112, e.g., preventing the file containing the sensitive data from being sent, redacting the sensitive data from the file prior to allowing the file to be sent, alerting an administrator of the attempted transmission of sensitive data, and the like.

Figure 2:
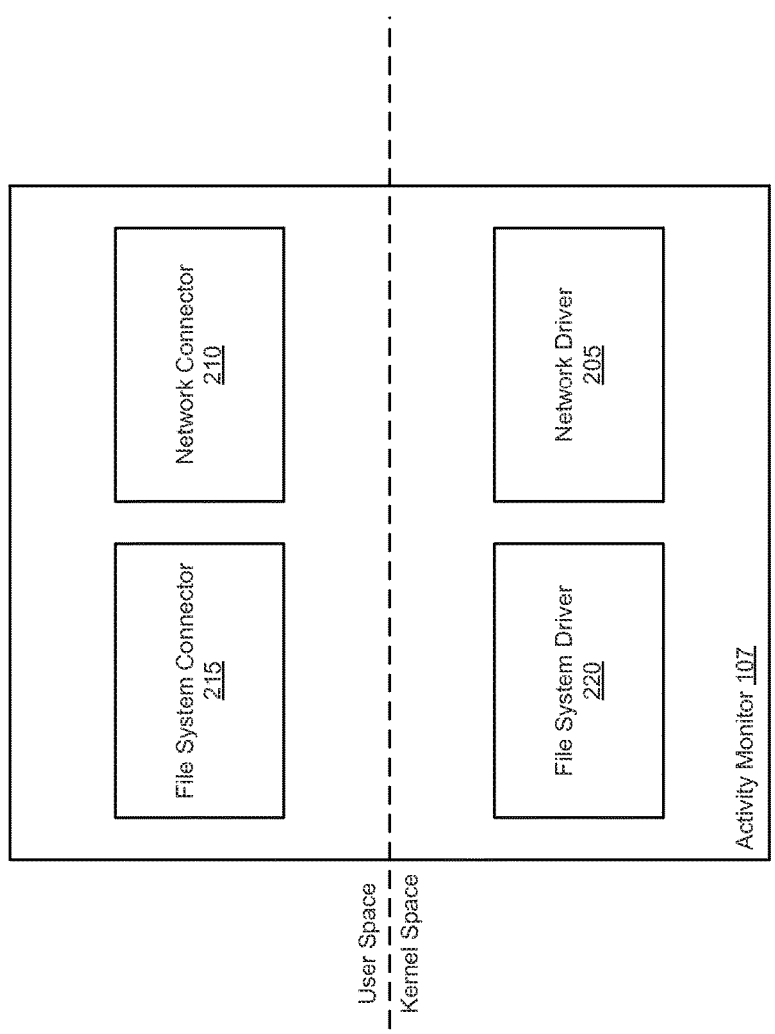
FIG. 2 further illustrates the activity monitor described relative to FIG. 1, according to one embodiment.

FIG. 2 further illustrates the activity monitor 107, according to one embodiment. Illustratively, the activity monitor 107 include components that reside in user space and kernel space of an operating system executing in the client computer 105. As shown, the activity monitor 107 includes a network driver 205 and a file system driver 220 in kernel space. The activity monitor 107 includes a network connector 210 and a file system connector 215 in user space.

In one embodiment, the file system driver 220 monitors and identifies file system activity occurring within a file system of the client computer 105. The network driver 205 may monitor a given application 108 based on network connectivity of the application 108, e.g., whether the application 108 has the ability to open a network connection. Additionally, the network driver 205 may determine whether to monitor a given application 108 based on whether the application 108 is on a whitelist of allowed applications. The allowed applications can be applications having legitimate business purposes for uploading sensitive data externally, such as e-mail clients.

Further, the network driver 205 may also determine whether to monitor unknown applications 108 based on a set of criteria indicating whether a user has access to initiate file transmissions within the application 107. Some criteria may include whether the application 108 has a graphical user interface (GUI) library, whether the application 108 has a common file dialog library). The network driver 205 may instruct the file system driver 220 to monitor applications that satisfy such criteria.

To identify applications 108 having network connections, the network driver 205 may enumerate Transmission Control Protocol (TCP) tables in the operating system during initialization of the DLP agent 106. The network driver 205 can then obtain a list of all executing applications 108 that have an external network connection as well as a connection count of processes that currently have network connections open. After initialization, the network driver 205 detects when a network connection is created or closed by the process. The network driver 205 may adjust the network connection count based on connections that are created or closed.

In one embodiment, the file system driver 220 monitors file system activity of a given application 108. For example, the file system driver 220 may monitor the application 108 for file system activity that might indicate that the application 108 is attempting to send a file through an open external network connection. If such activity is detected, the file system driver 220 may intercept file open and file read operations and instruct the file system connector 215 to analyze the file for sensitive data based on a DLP policy 112.

In one embodiment, the network connector 210 detects instances where an application 108 initiates a network connection. Further, the network connector 210 receives connection count information from the network driver 205. Further, the network connector 210 may notify the file system connector 215 when the connection count of an application 108 is zero. In such a case, the file system connector 215 may notify the file system driver 220 to stop monitoring file system activity of the application 108.

Further, the network connector 210 may maintain a history of network connections of the application 108. The activity monitor 107 may determine, based on evaluating the network connection history of the application 108, whether to continue monitoring file system activity of the application 108. For example, the file system driver 220 may continue monitoring the activity if the network connection history indicates a probability that the application 108 may continue to read data and open a new network connection to send the data even after all current network connections are closed.

The file system connector 215 determines, based on one or more policies 112, whether a file (that an application 108 is attempting to send over the network) contains sensitive data. Depending on the policy 112, the file system connector 215 may block a file system operation from being performed if the file contains sensitive data. Based on the policy 112, the file system connector 215 can allow the file operation to be performed if the file contains sensitive data. In such a case, the file system connector 215 may redact the sensitive data from the file prior to allowing the file operation to be performed. For example, the file system connector 215 may send empty data in place of the sensitive data. In addition, the file system connector 215 may generate an incident report indicating the attempted transmission of sensitive data to an external network location.

Figure 3:
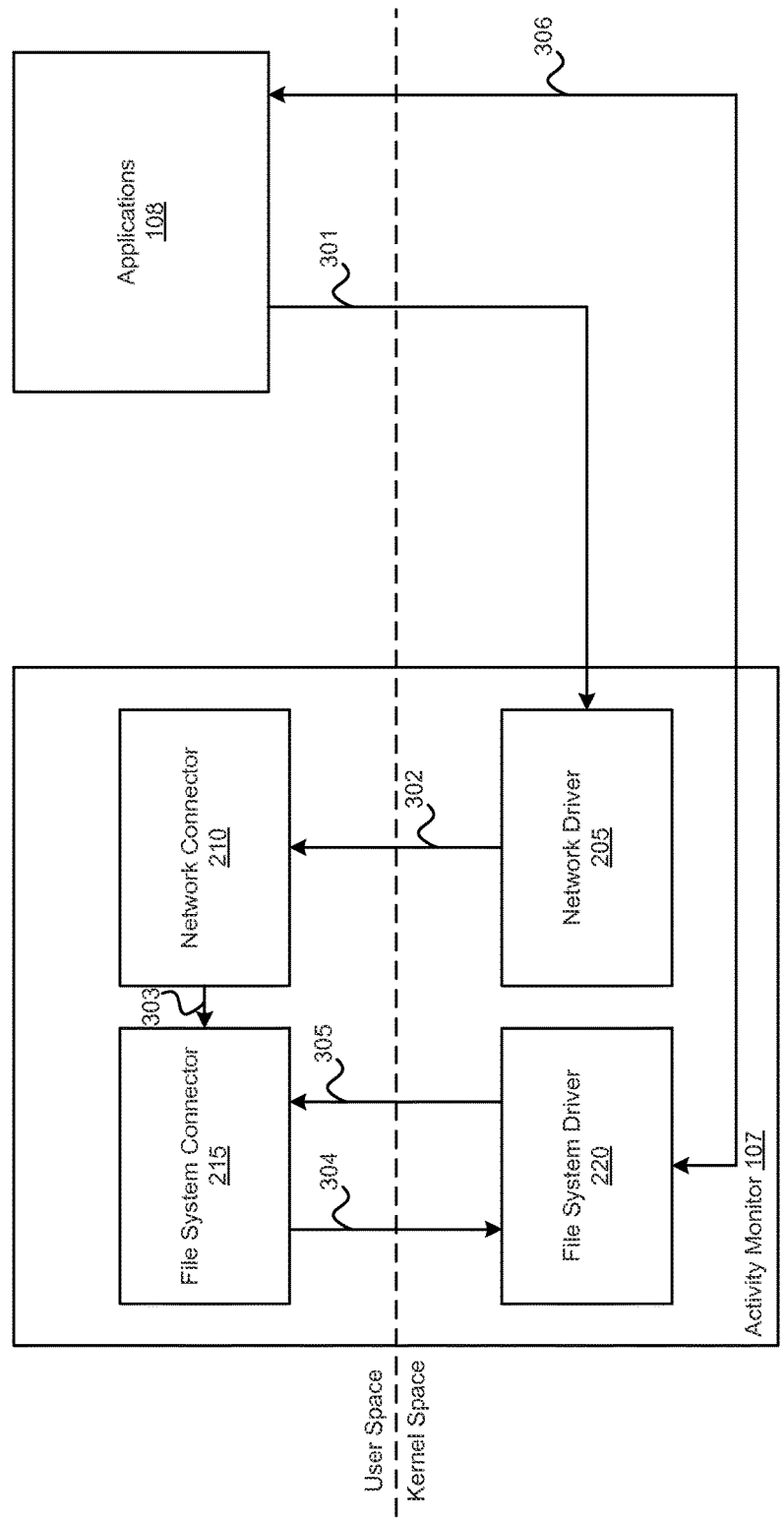
FIG. 3 further illustrates the activity monitor described relative to FIG. 1, according to one embodiment.

FIG. 3 illustrates an example flow of the activity monitor 107 tracking file system activity of applications 108, according to one embodiment. For example, assume that an application 108 that is representative of a word processor opens a network connection. At 301, the network driver 205 detects the opening of the network connection. At 302, the network driver 205 notifies the network connector 210 in user space that the application 108 has opened a network connection. The network connector 210 increments the count of network connections for the application 108.

At 303, the network connector 210 may notify the file system connector 215 that the application 108 has a network connection open and that the application 108 should be monitored. At 304, the file system connector 215 instructs the file system driver 220 in kernel space to monitor file system activity of the application 108. At 306, the file system driver 220 monitors the file system activity of the application 108. Thereafter, the file system driver 220 may determine whether file system operations initiated by the application 108 indicates that the application 108 is attempting to send a file over the network. At 305, the file system driver 220 intercepts such activity and instructs the file system connector 215 to evaluate the file for sensitive data based on a policy 112. The file system connector 215 can then act according to the policy in the event that the file contains sensitive data (e.g., preventing the file system operation from occurring, redacting the sensitive data prior to allowing the file system operation to occur, etc.).

Figure 4A:
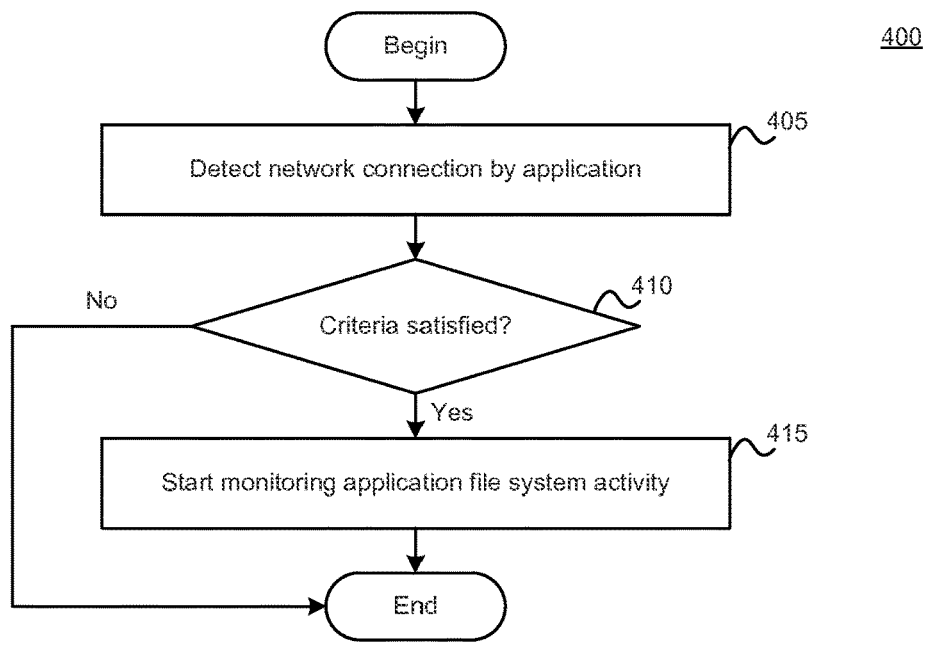
FIG. 4A illustrates a method for initializing an activity monitor to detect file system activity of an application, according to one embodiment.

FIG. 4A illustrates a method 400 for initializing an activity monitor to detect file system activity of an application, according to one embodiment. At step 405, the network driver 205 detects a network connection being opened by an application 108. The network driver 205 notifies the network connector 210 of the new open network connection. The network connector 210 may increment a counter for open connections by that application.

At step 410, the network connector 210 may optionally evaluate criteria to determine whether file system activity initiated by the application 108 should be monitored. The criteria indicates a likelihood that, if satisfied, the application 108 allows user interaction, e.g., with a user interface (as opposed to a background process that connects to the network, which the DLP agent 106 may avoid monitoring). As stated, such criteria may include whether the application 108 includes a common file dialog, a graphical user interface library, and the like.

In one embodiment, the network connector 210 may also evaluate a whitelist of legitimate business applications to not monitor while performing DLP. If the application 108 does not satisfy the criteria or is included in the whitelist of applications, then the method 400 ends.

However, if the criteria are satisfied (and if the application 108 is not included in the whitelist), then the DLP agent 106 begins monitoring file system activity of the application 108. To do so, the network connector 210 notifies the file system connector 215 that the file system activity of the application 108 should be monitored. In turn, the file system connector 215 instructs the file system driver 220 to do so within kernel space.

Figure 4B:
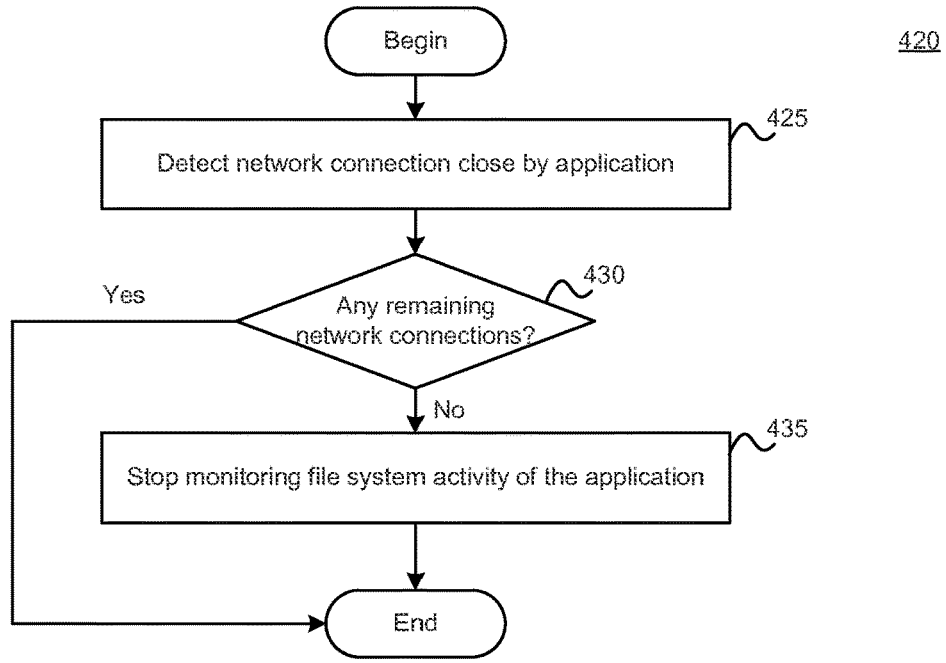
FIG. 4B illustrates a method for managing an activity monitor, according to one embodiment.

FIG. 4B illustrates a method 420 for managing the activity monitor 107 in response to closed network connections, according to one embodiment. As shown, method 420 begins at step 425, where the network driver 205 detects that the application 108 (having file system activity currently being monitored by the file system driver 220) has closed a network connection. The network driver 205 notifies the network connector 210 of the closed connection. In turn, the network connector 210 decrements a network connection counter associated with the application 108.

At step 430, the network connector 210 determines, based on the network connection counter, whether any network connections for that application 108 remain. If so, then the file system driver 220 continues monitoring the application 108, and method 425 ends. Otherwise, then at step 435, the activity monitor 107 stops monitoring the file system activity of the application 108. To do so, the network connector 210 notifies the file system connector 215 that the network connections are closed for the application 108. In turn, the file system connector 215 may instruct the file system driver 220 to stop monitoring file system activity for the application 108.

As stated, the activity monitor 107 may maintain a network connection history for the application 108. In one embodiment, the activity monitor 107 may evaluate the network connection history of the application 108 to determine whether to continue monitoring the application 108 even if the application 108 currently has no open connections. For example, the activity monitor 107 may determine whether an amount of network connections for the application 108 exceeds a threshold of network connections being opened and closed within a specified window of time. If so, the file system connector 215 may instruct the file system driver 220 to continue monitoring the file system activity of the application 108.

Figure 5:
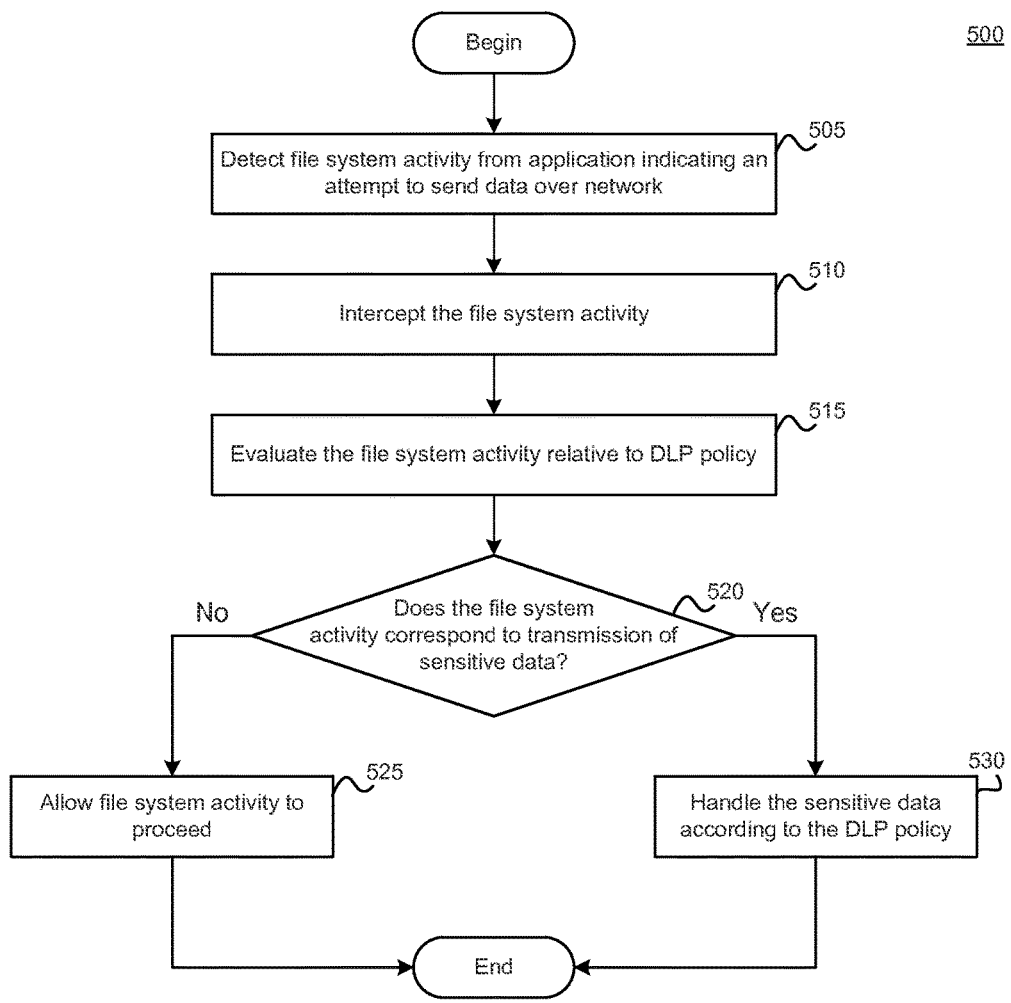
FIG. 5 illustrates a method for monitoring file system activity of an application, according to one embodiment.

FIG. 5 illustrates a method 500 for monitoring file system activity of an application, according to one embodiment. As shown, the method 500 begins at step 505 where the file system driver 220 detects a request to perform file system activity from the application 108 that indicates that the application 108 is attempting to send data over the network. For example, such file system activity may include open and read operations for a given file.

At step 510, the file system driver 220 intercepts the file open or file read operation. For example, assume that the application 108 is a word processing application and that the application 108 has initiated a network connection to send a documents containing credit card information to a cloud repository. In such a case, the application 108 performs open and read operations on the document to do so. The file system driver 220 intercepts these operations.

At step 515, the file system connector 215 evaluates the file system activity relative to a DLP policy 112. The file system connector 215 does so to determine whether the application 108 is attempting to send sensitive data to an external network location (at step 520). Continuing the previous example, the file system driver 220 may determine, based on the DLP policy 112, that the credit card information is sensitive data and that the cloud repository is an unauthorized network location. In such a case, then at step 530, the file system connector 215 handles the sensitive data according to the DLP policy 112. For instance, the file system driver 220 may block the file system activity from occurring. As another example, the file system driver 220 may redact the sensitive data. For instance, the file system driver 220 may send empty data in place of the sensitive data when the application 108 transmits the document to the network location. In addition, the file system connector 215 may generate an incident report (e.g., to be sent to an administrator) indicating the attempted transmission of sensitive data.

In the event that the file system activity does not correspond to an attempted transmission of sensitive data, then at step 525, the file system driver 220 allows the file system activity to proceed. To do so, the file system driver 220 may release the intercepted file system operations.

Figure 6:
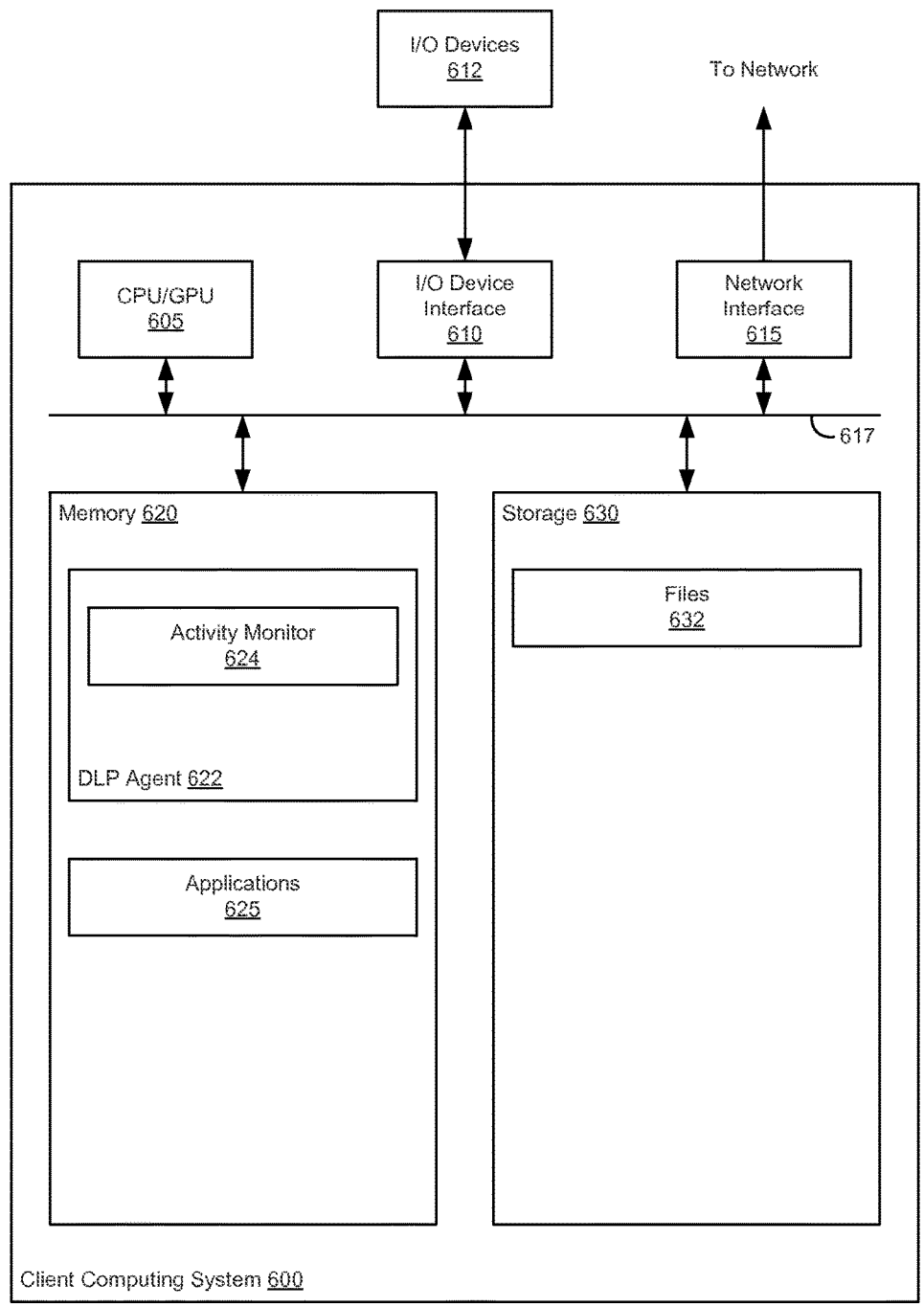
FIG. 6 illustrates an example computing system configured to monitor file system activity of an application, according to one embodiment.

FIG. 6 illustrates a client computing system 600 configured to monitor file system activity of user applications, according to one embodiment. As shown, computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the client computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a DLP agent 622 and one or more applications 625. And storage 630 includes files 632. In one embodiment, the DLP agent 622 further includes an activity monitor 624. The activity monitor 624 determines whether any of the applications 625 are capable of sending files 632 through a network (e.g., the Internet). For example, the activity monitor 624 may enumerate TCP tables and obtain a listing of currently open network connections per process. In addition, the activity monitor 624 can detect when an application 625 has opened or closed a connection.

In one embodiment, the activity monitor 624 tracks file system activity of applications 625 that have open connections. For example, the activity monitor 624 tracks open and read operations performed by those applications 625 on files 632. The activity monitor 624 may intercept such open and read operations for a file 632. Doing so allows the activity monitor 624 to evaluate the file 632 against a DLP policy (e.g., residing in the client computing system 600 or on a DLP server) prior to any further file system activity by the application 625. The activity monitor 624 does so to determine whether the file 632 specified in the file system operations contains sensitive data.

The activity monitor 624 handles the file system operation according to the DLP policy. For example, if the file includes sensitive data, the activity monitor 624 may block the file system operation from occurring. If the file does not include sensitive data, the activity monitor 624 may release the file system operation and allow the operation to occur. In addition, the activity monitor 624 may redact the sensitive data from the file prior to allowing the file system operation to occur. To do so, the activity monitor 624 can replace the sensitive data in the file with empty data blocks. Of course, the activity monitor 624 may apply other methods to redact sensitive data from the file.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
  detecting an application creating a network connection;
  determining, in response to detecting the application creating the network connection, whether the application satisfies one or more criteria including whether the application has a common file dialog library and whether the application has a graphical user interface;
  upon determining that the application satisfies the one or more criteria, monitoring file system activity in the application;
  upon detecting a request from the application to perform the file system activity on a file, intercepting the file system activity;
  evaluating the file system activity according to a data loss prevention (DLP) policy, wherein the evaluation comprises:
    determining whether the file includes sensitive data; and
    determining whether the network connection is to an unauthorized external location; and
  based on the evaluation that the file includes sensitive data and the network connection is to the unauthorized external location, preventing the application from sending the sensitive data in the file over the network connection.

2. The method of claim 1, wherein the application includes one or more open network connections.

3. The method of claim 2, wherein the one or more open network connections are detected by enumerating one or more TCP tables.

4. The method of claim 2, further comprising:
  monitoring network activity of the application for the creation of one or more new network connections.

5. The method of claim 1, wherein preventing the sensitive data in the file from being sent over the network connection comprises:
  blocking the request.

6. The method of claim 1, wherein preventing the sensitive data in the file from being sent over the network connection comprises:
  redacting the sensitive data from the file; and
  granting the request after the redaction.

7. The method of claim 1, further comprising:
  upon determining, based on the evaluation, that the file does not contain sensitive data, granting the request.

8. The method of claim 1, further comprising:
  upon determining, based on the evaluation, that the file does contain sensitive data, generating an incident report.

9. A non-transitory computer-readable storage medium having instructions, which, when executed, perform an operation comprising:
  detecting an application creating a network connection;
  determining, in response to detecting the application creating the network connection, whether the application satisfies one or more criteria including whether the application has a common file dialog library and whether the application has a graphical user interface;
  upon determining that the application satisfies the one or more criteria, monitoring file system activity in the application;
  upon detecting a request from the application to perform the file system activity on a file, intercepting the file system activity;
  evaluating the file system activity according to a data loss prevention (DLP) policy, wherein the evaluation comprises:
    determining whether the file includes sensitive data; and
    determining whether the network connection is to an unauthorized external location; and
  based on the evaluation that the file includes sensitive data and the network connection is to the unauthorized external location, preventing the application from sending the sensitive data in the file over the network connection.

10. The computer-readable storage medium of claim 9, wherein the application includes one or more open network connections.

11. The computer-readable storage medium of claim 10, wherein the one or more open network connections are detected by enumerating one or more TCP tables.

12. The computer-readable storage medium of claim 9, wherein preventing the sensitive data in the file from being sent over the network connection comprises:
   blocking the request.

13. The computer-readable storage medium of claim 9, wherein preventing the sensitive data in the file from being sent over the network connection comprises:
   redacting the sensitive data from the file; and
   granting the request after the redaction.

14. The computer-readable storage medium of claim 9, the operation further comprising:
   upon determining, based on the evaluation, that the file does contain sensitive data, generating an incident report.

15. A system comprising:
   a processor; and
   a memory storing program code, which, when executed on the processor, performs an operation comprising:
      detecting an application creating a network connection;
      determining, in response to detecting the application creating the network connection, whether the application satisfies one or more criteria including whether the application has a common file dialog library and whether the application has a graphical user interface;
      upon determining that the application satisfies the one or more criteria, monitoring file system activity in the application;
      upon detecting a request from the application to perform the file system activity on a file, intercepting the file system activity;
      evaluating the file system activity according to a data loss prevention (DLP) policy, wherein the evaluation comprises:
         determining whether the file includes sensitive data; and
         determining whether the network connection is to an unauthorized external location; and
      based on the evaluation that the file includes sensitive data and the network connection is to the unauthorized external location, preventing the application from sending the sensitive data in the file over the network connection.

16. The system of claim 15, wherein the application includes one or more open network connections.

17. The system of claim 16, wherein the one or more open network connections are detected by enumerating one or more TCP tables.

18. The system of claim 15, wherein preventing the sensitive data in the file from being sent over the network connection comprises:
   blocking the request.

19. The system of claim 15, wherein preventing the sensitive data in the file from being sent over the network connection comprises:
   redacting the sensitive data from the file; and
   granting the request after the redaction.

20. The system of claim 15, the operation further comprising:
   upon determining, based on the evaluation, that the file does contain sensitive data, generating an incident report.

\* \* \* \* \*